US010241882B2

(12) United States Patent
Avery et al.

(10) Patent No.: US 10,241,882 B2
(45) Date of Patent: Mar. 26, 2019

(54) SYSTEM AND METHOD FOR DYNAMIC ADJUSTMENT OF LOGGING

(71) Applicant: International Business Machines Corporation, Armonk, NY (US)

(72) Inventors: Kenytt D. Avery, Newport Beach, CA (US); Edward L. Bader, Los Angeles, CA (US); Jean-Marc Costecalde, Irvine, CA (US); Patricia V. Gatewood, Costa Mesa, CA (US); Kevin N. Trinh, Garden Grove, CA (US)

(73) Assignee: International Business Machines Corporation, Armonk, NY (US)

( * ) Notice: Subject to any disclaimer, the term of this patent is extended or adjusted under 35 U.S.C. 154(b) by 181 days.

(21) Appl. No.: 15/264,700

(22) Filed: Sep. 14, 2016

(65) Prior Publication Data

US 2018/0074930 A1    Mar. 15, 2018

(51) Int. Cl.
*G06F 11/00*    (2006.01)
*G06F 11/30*    (2006.01)
*G06F 11/34*    (2006.01)

(52) U.S. Cl.
CPC ........ *G06F 11/3072* (2013.01); *G06F 11/302* (2013.01); *G06F 11/3096* (2013.01); *G06F 11/3433* (2013.01); *G06F 11/3476* (2013.01); *G06F 11/3495* (2013.01)

(58) Field of Classification Search
CPC ............. G06F 11/3414; G06F 11/3452; G06F 11/3072; G06F 11/3433; G06F 11/3476; G06F 11/3495; G06F 11/3466; G06F 2209/5019
See application file for complete search history.

(56) References Cited

U.S. PATENT DOCUMENTS

| 6,934,826 B2 | 8/2005 | Lubbers et al. |
| 8,886,796 B2 | 11/2014 | Calder et al. |
| 9,063,944 B2 | 6/2015 | Agarwal et al. |
| 9,342,438 B2 | 5/2016 | Han |

(Continued)

OTHER PUBLICATIONS

Disclosed Anonymously, "Dynamic Logging Severity Based on Error Level and Frequency," IP.COM, IP.COM No. IPCOM000239773D, dated Dec. 1, 2014, pp. 1-4.

(Continued)

*Primary Examiner* — Charles Ehne (74) *Attorney, Agent, or Firm* — Brian J. Colandreo, Esq.; Jeffrey T. Placker, Esq.; Holland & Knight LLP (57) ABSTRACT

A method, computer program product, and computer system for identifying a current amount of resources used by a computing device. A future amount of resources may be estimated for executing a trace for a subsystem of the computing device. One or more rules may be identified for executing the trace for the subsystem of the computing device, wherein the one or more rules may be based upon, at least in part, at least one of the current amount of resources used by the computing device and the future amount of resources for executing the trace for the subsystem of the computing device. It may be determined whether to execute the trace for the subsystem of the computing device based upon, at least in part, the one or more rules.

17 Claims, 6 Drawing Sheets

(56) References Cited

U.S. PATENT DOCUMENTS

| | | | | |
|---|---|---|---|---|
| 2008/0270595 A1* | 10/2008 | Rolia | ............... | G06F 11/263 709/224 |
| 2008/0271038 A1* | 10/2008 | Rolia | ............... | G06F 9/505 718/105 |
| 2008/0271039 A1* | 10/2008 | Rolia | ............... | G06Q 10/06 718/105 |
| 2013/0283241 A1* | 10/2013 | Krajec | ............... | G06F 11/3636 717/128 |

OTHER PUBLICATIONS

Disclosed Anonymously, "Dynamic Scaling Up or Scaling Down of the Diagnostic Trace Level by Mapping the Scope to the Problem Area," IP.COM, IP.COM No. IPCOM000236960D, dated May 23, 2014, pp. 1-8.

Disclosed Anonymously, "Real Time Dynamic Enablement of Tracing to Troubleshoot Complex Applications in Production Environments," IP.COM, IP.COM No. IPCOM000207218D, May 19, 2011, pp. 1-2.

IBM, "Method and System for Dynamically Adjusting Debug Level for Better Diagnose," IP.COM, IP.COM No. IPCOM000174090D, Aug. 26, 2008, pp. 1-10.

\* cited by examiner

SYSTEM AND METHOD FOR DYNAMIC ADJUSTMENT OF LOGGING

BACKGROUND

Generally, investigating run-time issues may involve logging. Typically, logging is resource intensive (e.g., CPU, memory, disk I/O, etc.) and may cause performance issues in the system. For example, a system may be operating well initially upon executing a logging process, but may crash when the workload increases.

BRIEF SUMMARY OF DISCLOSURE

In one example implementation, a method, performed by one or more computing devices, may include but is not limited to identifying, by a computing device, a current amount of resources used by the computing device. A future amount of resources may be estimated for executing a trace for a subsystem of the computing device. One or more rules may be identified for executing the trace for the subsystem of the computing device, wherein the one or more rules may be based upon, at least in part, at least one of the current amount of resources used by the computing device and the future amount of resources for executing the trace for the subsystem of the computing device. It may be determined whether to execute the trace for the subsystem of the computing device based upon, at least in part, the one or more rules.

One or more of the following example features may be included. It may be determined whether the current amount of resources used by the computing device combined with the future amount of resources for executing the trace for the subsystem of the computing device would exceed a threshold amount of resources used by the computing device. At least one rule of the one or more rules may include executing the trace for the subsystem of the computing device if the current amount of resources used by the computing device combined with the future amount of resources for executing the trace for the subsystem of the computing device would not exceed the threshold amount of resources used by the computing device. At least one rule of the one or more rules may include preventing execution of the trace for the subsystem of the computing device if the current amount of resources used by the computing device combined with the future amount of resources for executing the trace for the subsystem of the computing device would exceed the threshold amount of resources used by the computing device. The subsystem of the computing device may include a priority. At least one rule of the one or more rules may include disabling, during run-time, execution of the trace for the subsystem of the computing device if the current amount of resources used by the computing device exceeds the threshold amount of resources used by the computing device and the priority for the subsystem is at a predetermined level. At least one rule of the one or more rules may include enabling, during run-time, execution of the trace for the subsystem of the computing device if the current amount of resources used by the computing device exceeds the threshold amount of resources used by the computing device and the priority for the subsystem is at a predetermined level.

In another example implementation, a computing system may include one or more processors and one or more memories configured to perform operations that may include but are not limited to identifying a current amount of resources used by a computing device. A future amount of resources may be estimated for executing a trace for a subsystem of the computing device. One or more rules may be identified for executing the trace for the subsystem of the computing device, wherein the one or more rules may be based upon, at least in part, at least one of the current amount of resources used by the computing device and the future amount of resources for executing the trace for the subsystem of the computing device. It may be determined whether to execute the trace for the subsystem of the computing device based upon, at least in part, the one or more rules.

One or more of the following example features may be included. It may be determined whether the current amount of resources used by the computing device combined with the future amount of resources for executing the trace for the subsystem of the computing device would exceed a threshold amount of resources used by the computing device. At least one rule of the one or more rules may include executing the trace for the subsystem of the computing device if the current amount of resources used by the computing device combined with the future amount of resources for executing the trace for the subsystem of the computing device would not exceed the threshold amount of resources used by the computing device. At least one rule of the one or more rules may include preventing execution of the trace for the subsystem of the computing device if the current amount of resources used by the computing device combined with the future amount of resources for executing the trace for the subsystem of the computing device would exceed the threshold amount of resources used by the computing device. The subsystem of the computing device may include a priority. At least one rule of the one or more rules may include disabling, during run-time, execution of the trace for the subsystem of the computing device if the current amount of resources used by the computing device exceeds the threshold amount of resources used by the computing device and the priority for the subsystem is at a predetermined level. At least one rule of the one or more rules may include enabling, during run-time, execution of the trace for the subsystem of the computing device if the current amount of resources used by the computing device exceeds the threshold amount of resources used by the computing device and the priority for the subsystem is at a predetermined level.

In another example implementation, a computer program product may reside on a computer readable storage medium having a plurality of instructions stored thereon which, when executed across one or more processors, may cause at least a portion of the one or more processors to perform operations that may include but are not limited to identifying a current amount of resources used by a computing device. A future amount of resources may be estimated for executing a trace for a subsystem of the computing device. One or more rules may be identified for executing the trace for the subsystem of the computing device, wherein the one or more rules may be based upon, at least in part, at least one of the current amount of resources used by the computing device and the future amount of resources for executing the trace for the subsystem of the computing device. It may be determined whether to execute the trace for the subsystem of the computing device based upon, at least in part, the one or more rules.

One or more of the following example features may be included. It may be determined whether the current amount of resources used by the computing device combined with the future amount of resources for executing the trace for the subsystem of the computing device would exceed a threshold amount of resources used by the computing device. At least one rule of the one or more rules may include executing the trace for the subsystem of the computing device if the current amount of resources used by the computing device combined with the future amount of resources for executing the trace for the subsystem of the computing device would not exceed the threshold amount of resources used by the computing device. At least one rule of the one or more rules may include preventing execution of the trace for the subsystem of the computing device if the current amount of resources used by the computing device combined with the future amount of resources for executing the trace for the subsystem of the computing device would exceed the threshold amount of resources used by the computing device. The subsystem of the computing device may include a priority. At least one rule of the one or more rules may include disabling, during run-time, execution of the trace for the subsystem of the computing device if the current amount of resources used by the computing device exceeds the threshold amount of resources used by the computing device and the priority for the subsystem is at a predetermined level. At least one rule of the one or more rules may include enabling, during run-time, execution of the trace for the subsystem of the computing device if the current amount of resources used by the computing device exceeds the threshold amount of resources used by the computing device and the priority for the subsystem is at a predetermined level.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

System Overview:
As will be appreciated by one skilled in the art, aspects of the present disclosure may be embodied as a system, a method, and/or a computer program product at any possible technical detail level of integration. The computer program product may include a computer readable storage medium (or media) having computer readable program instructions thereon for causing a processor to carry out aspects of the present invention.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Computer program code for carrying out operations for aspects of the present disclosure may be written in any combination of one or more programming languages, including an object oriented programming language such as Java, Python, Scala, Ruby, and Node.js, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
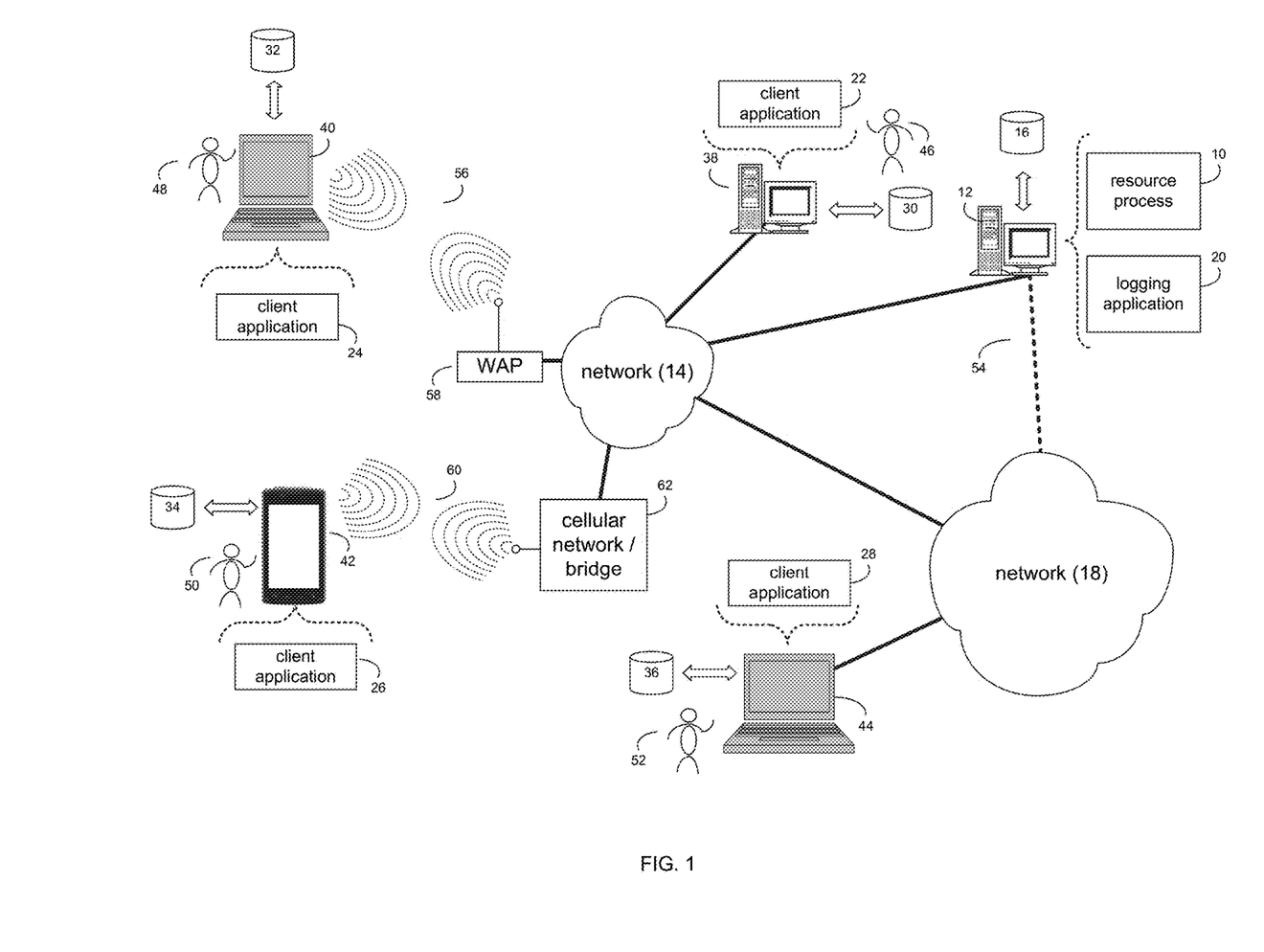
FIG. 1 is an example diagrammatic view of a resource process coupled to an example distributed computing network according to one or more example implementations of the disclosure.

Referring now to the example implementation of FIG. 1, there is shown resource process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a resource process, such as resource process 10 of FIG. 1, may identify a current amount of resources used by a computing device. A future amount of resources may be estimated for executing a trace for a subsystem of the computing device. One or more rules may be identified for executing the trace for the subsystem of the computing device, wherein the one or more rules may be based upon, at least in part, at least one of the current amount of resources used by the computing device and the future amount of resources for executing the trace for the subsystem of the computing device. It may be determined whether to execute the trace for the subsystem of the computing device based upon, at least in part, the one or more rules.

In some implementations, the instruction sets and subroutines of resource process 10, which may be stored on storage device, such as storage device 16, coupled to computer 12, may be executed by one or more processors (not shown) and one or more memory architectures included within computer 12. In some implementations, storage device 16 may include but is not limited to: a hard disk drive;

a flash drive, a tape drive; an optical drive; a RAID array (or other array); a random access memory (RAM); and a read-only memory (ROM).

In some implementations, network 14 may be connected to one or more secondary networks (e.g., network 18), examples of which may include but are not limited to: a local area network; a wide area network; or an intranet, for example.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, resource process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, computer 12 may execute a logging application (e.g., logging application 20), examples of which may include, but are not limited to, e.g., a diagnostics application, an auditing application, a tracing application, or other application that allows for investigating/recording information about a program's execution, which may be used, e.g., to identify run-time issues. In some implementations, resource process 10 and/or logging application 20 may be accessed via one or more of client applications 22, 24, 26, 28. In some implementations, resource process 10 may be a standalone application, or may be an applet/application/script/extension that may interact with and/or be executed within logging application 20, a component of logging application 20, and/or one or more of client applications 22, 24, 26, 28. In some implementations, logging application 20 may be a standalone application, or may be an applet/application/script/extension that may interact with and/or be executed within resource process 10, a component of resource process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of resource process 10 and/or logging application 20. Examples of client applications 22, 24, 26, 28 may include, but are not limited to, e.g., a diagnostics application, an auditing application, a tracing application, or other application that allows for investigating/recording information about a program's execution, which may be used, e.g., to identify run-time issues, a performance tracker application to track performance metrics of a system, a performance estimator application to estimate future performance metrics of a system, a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM).

Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet (not shown), a server (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Android™, Apple® iOS®, Mac® OS X®; Red Hat® Linux®, or a custom operating system.

In some implementations, one or more of client applications 22, 24, 26, 28 may be configured to effectuate some or all of the functionality of resource process 10 (and vice versa). Accordingly, in some implementations, resource process 10 may be a purely server-side application, a purely client-side application, or a hybrid server-side/client-side application that is cooperatively executed by one or more of client applications 22, 24, 26, 28 and/or resource process 10.

In some implementations, one or more of client applications 22, 24, 26, 28 may be configured to effectuate some or all of the functionality of logging application 20 (and vice versa). Accordingly, in some implementations, logging application 20 may be a purely server-side application, a purely client-side application, or a hybrid server-side/client-side application that is cooperatively executed by one or more of client applications 22, 24, 26, 28 and/or logging application 20. As one or more of client applications 22, 24, 26, 28, resource process 10, and logging application 20, taken singly or in any combination, may effectuate some or all of the same functionality, any description of effectuating such functionality via one or more of client applications 22, 24, 26, 28, resource process 10, logging application 20, or combination thereof, and any described interaction(s) between one or more of client applications 22, 24, 26, 28, resource process 10, logging application 20, or combination thereof to effectuate such functionality, should be taken as an example only and not to limit the scope of the disclosure.

In some implementations, one or more of users 46, 48, 50, 52 may access computer 12 and resource process 10 (e.g., using one or more of client electronic devices 38, 40, 42, 44) directly through network 14 or through secondary network 18. Further, computer 12 may be connected to network 14 through secondary network 18, as illustrated with phantom link line 54. Resource process 10 may include one or more user interfaces, such as browsers and textual or graphical user interfaces, through which users 46, 48, 50, 52 may access resource process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi®, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

Figure 2:
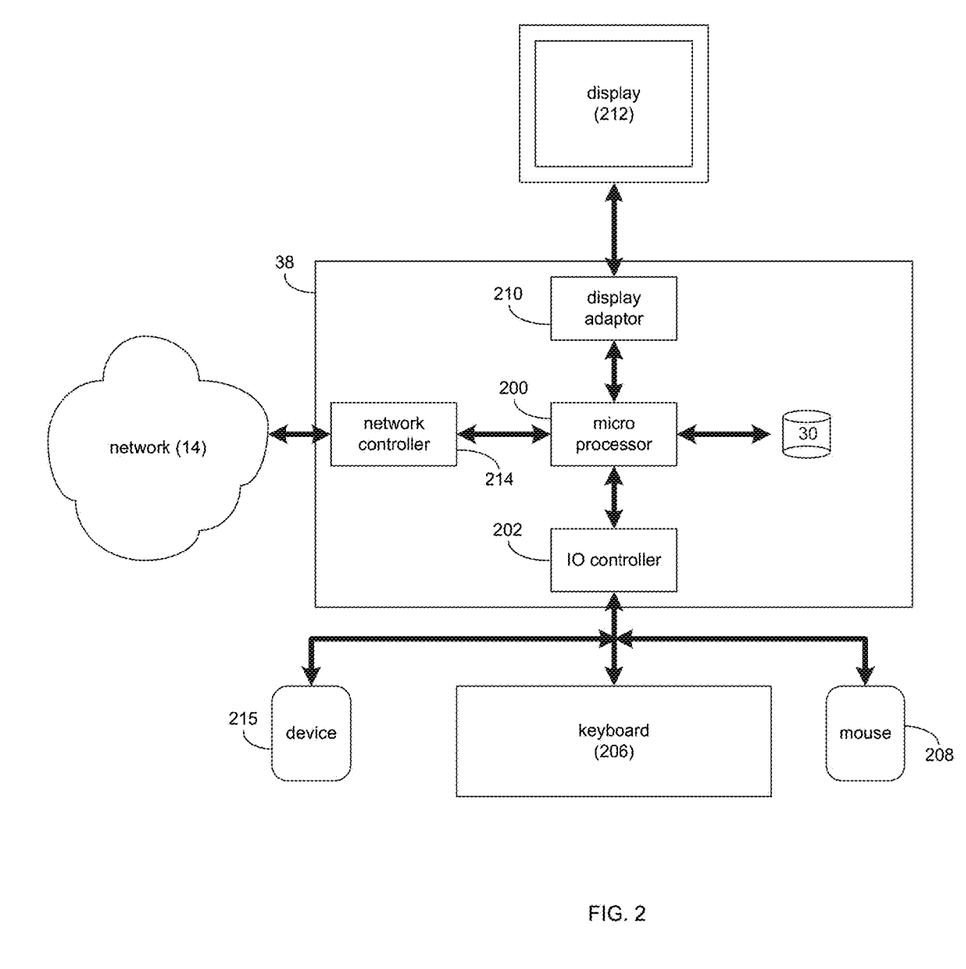
FIG. 2 is an example diagrammatic view of a client electronic device of FIG. 1 according to one or more example implementations of the disclosure.

Referring also to the example implementation of FIG. 2, there is shown a diagrammatic view of client electronic device 38. While client electronic device 38 is shown in this figure, this is for example purposes only and is not intended to be a limitation of this disclosure, as other configurations are possible. Additionally, any computing device capable of executing, in whole or in part, resource process 10 may be substituted for client electronic device 38 (in whole or in part) within FIG. 2, examples of which may include but are not limited to computer 12 and/or one or more of client electronic devices 40, 42, 44.

In some implementations, client electronic device 38 may include a processor and/or microprocessor (e.g., microprocessor 200) configured to, e.g., process data and execute the above-noted code/instruction sets and subroutines. Microprocessor 200 may be coupled via a storage adaptor (not shown) to the above-noted storage device(s) (e.g., storage device 30). An I/O controller (e.g., I/O controller 202) may be configured to couple microprocessor 200 with various devices, such as keyboard 206, pointing/selecting device (e.g., touchpad, touchscreen, mouse 208, etc.), custom device (e.g., device 215), USB ports (not shown), and printer ports (not shown). A display adaptor (e.g., display adaptor 210) may be configured to couple display 212 (e.g., touch-screen monitor(s), plasma, CRT, or LCD monitor(s), etc.) with microprocessor 200, while network controller/adaptor 214 (e.g., an Ethernet adaptor) may be configured to couple microprocessor 200 to the above-noted network 14 (e.g., the Internet or a local area network).

Generally, investigating run-time issues may involve logging. Typically, logging is resource intensive (e.g., CPU, memory, disk I/O, etc.) and may cause performance issues in the system. For example, a system may be operating well initially upon executing a logging process, but may crash when the workload increases. As will be discussed in greater detail below, in a system composed of multiple components, it may be beneficial to limit the component(s) to trace to avoid system performance issues. In some implementations, it may not be enough to limit logging to a specific scope to be executed. In some implementations, resource process 10 (e.g., in combination with logging application 20 and/or client application 38) may instrument the logging/tracing/auditing itself to determine the resources each subsystem tracing may consume. Resource process 10 may then be able to determine which subsystem components may be available for tracing, based on the expected workload (e.g., CPU, memory, disk I/O) cost of the logging and the current/expected system workload. In some implementations, when choosing which logging subsystem to enable for a given issue, the user (e.g., user 46) may (e.g., via resource process 10) set a priority level for one or more of the subsystems. In some implementations, the logging for the lowest priority subsystems may be automatically disabled at run-time based on the computing devices' (or system as a whole) current workload, thus avoiding overall performance issues.

The Resource Process:

As discussed above and referring also at least to the example implementations of FIGS. 3-6, resource process 10 may identify 300 a current amount of resources used by a computing device. Resource process 10 may estimate 302 a future amount of resources for executing a trace for a subsystem of the computing device. Resource process 10 may identify 304 one or more rules for executing the trace for the subsystem of the computing device, wherein the one or more rules may be based upon, at least in part, at least one of the current amount of resources used by the computing device and the future amount of resources for executing the trace for the subsystem of the computing device. Resource process 10 may determine 306 whether to execute the trace for the subsystem of the computing device based upon, at least in part, the one or more rules.

Figure 3:
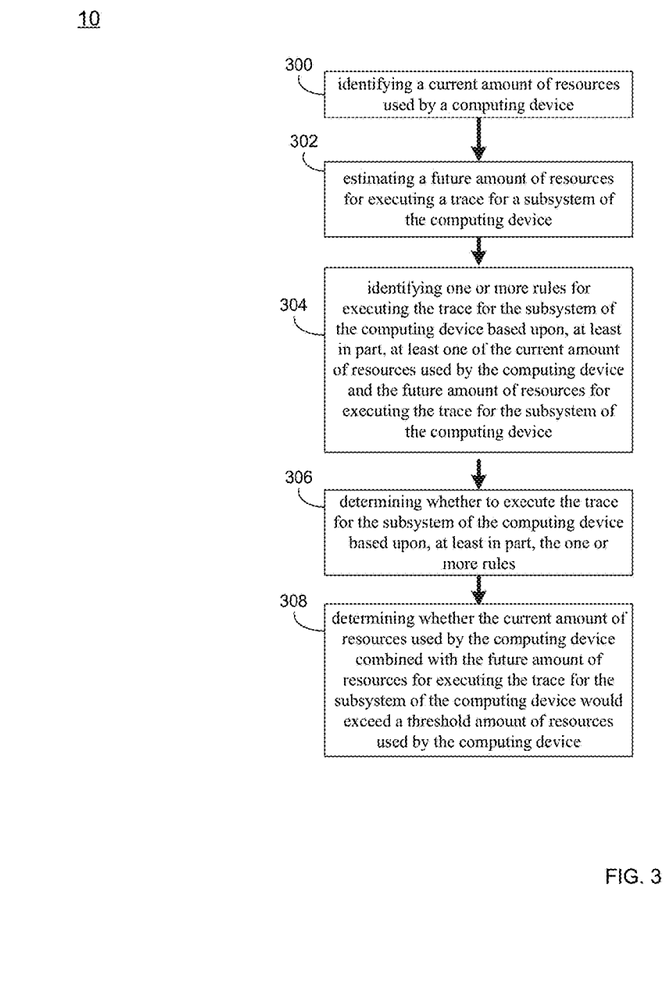
FIG. 3 is an example flowchart of a resource process according to one or more example implementations of the disclosure.
Figure 4:
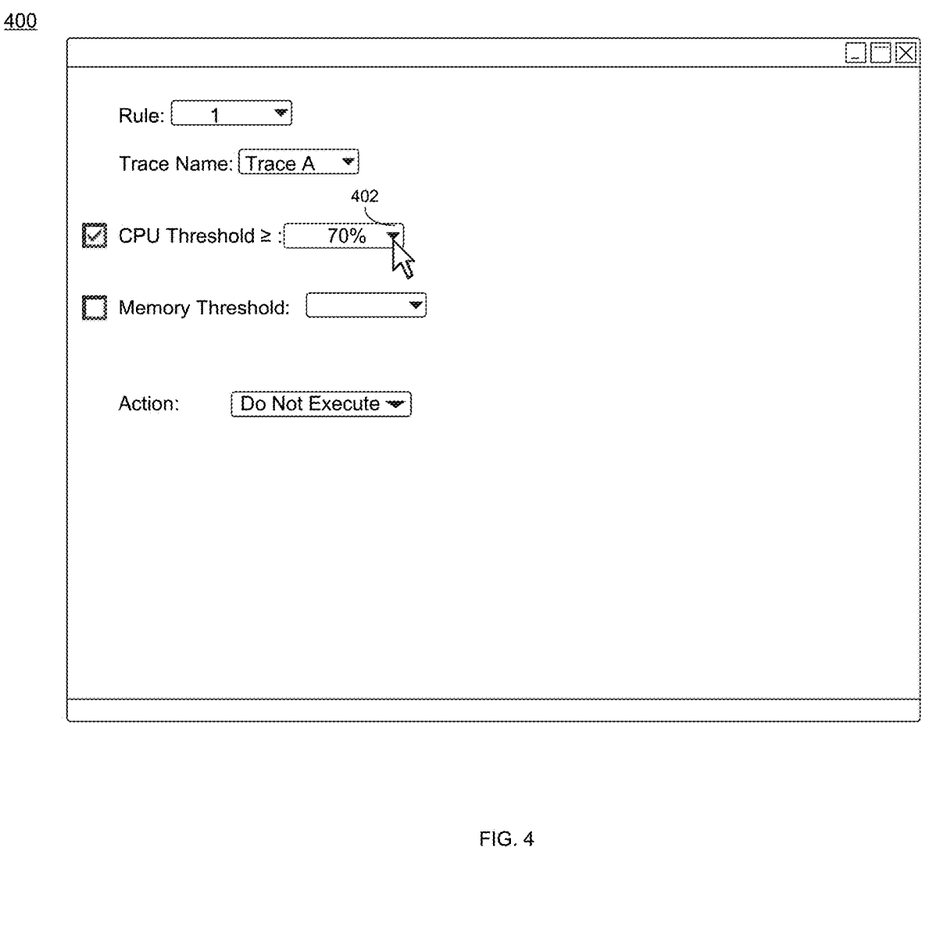
FIG. 4 is an example diagrammatic view of a screen image displayed by a resource process according to one or more example implementations of the disclosure.

In some implementations, resource process 10 may identify 300 a current amount of resources used by a computing device. For instance, assume for example purposes only that a computing device (e.g., client electronic device 38) is currently executing, e.g., one or more processes, resulting in the use of resources (e.g., CPU, memory, I/O, etc.) of client electronic device 38. In the example, resource process 10 may identify 300 the current amount of resources used by client electronic device 38. In some implementations, resource process 10 may include one or more capabilities of a performance monitoring/listening process, such as FileNet Performance Clearing House offered by IBM®) otherwise known as PCH, to identify 300 the current amount of resources being used. It will be appreciated that while counters and PCH are used in one or more example implementations, other performance monitoring/listening techniques and software other than PCH may be used without departing from the scope of the disclosure.

In some implementations, resource process 10 may estimate 302 a future amount of resources for executing a trace for a subsystem of the computing device. For example, in some implementations, resource process 10 may include one or more capabilities of a content capacity planner process, such as IBM® Content Capacity Planner) otherwise known as ICCP, to estimate 302 the future amount of resources for executing the trace for the subsystem of client electronic device 38. For instance, just as executing some processes may result in the use of resources (e.g., CPU, memory, I/O, etc.) of client electronic device 38, the future execution of one or more processes (e.g., traces) may result in the future use of resources. In the example, resource process 10 may estimate 302 the future amount of resources for executing the trace for the subsystem of client electronic device 38. It will be appreciated that while ICCP is used in one or more example implementations, other capacity planner process techniques and software other than ICCP may be used without departing from the scope of the disclosure.

For instance, and continuing with the above example, counters (e.g., via resource process 10) may be used to estimate 302 resource costs (e.g., using predetermined weights for each subsystem based the above-noted ICCP capabilities of resource process 10). In some implementations, counters (e.g., via resource process 10) may track performance metrics for any processes and/or computing devices as part of the individual client electronic device 38 and/or system as a whole. In some implementations, as resource process 10 runs, resource process 10 may start generating counters that may be used to adjust these estimates based on the real run-time data that the system (e.g., via resource process 10) may already be collecting. Based on those counters, resource process 10 may extrapolate and estimate 302 the resource costs for enabling one or more particular logging processes before one or more of the particular logging processes is actually enabled. As will be discussed in greater detail, once enabled (e.g., via resource process 10), resource process 10 may adjust the logging based on real run-time costs.

In some implementations, resource process 10 may dynamically adjust logging based on, e.g., run-time system utilization. For instance, in some implementations, the above-noted counters may track performance metrics, such as RPC response time for a given API call of an application, and system resources like CPU utilization. In some implementations, as noted above, resource process 10 may include the ability to make sizing estimates based on the estimated workload for a given hardware. In some implementations, resource process 10 may provide an initial weighted cost for each of the application components (e.g., processes), including the cost for logging during an average projected workload. In some implementations, resource process 10 may help set a baseline cost before a system (or process) is actually running. As the system runs, it may start generating counters that adjust these based on the real run-time data that the system (e.g., via resource process 10) may be already collecting. Based on those counters, resource process 10 may extrapolate and estimate 302 the resource costs for enabling one or more particular logging processes before one or more of the particular logging processes is actually enabled. As will be discussed in greater detail, once enabled (e.g., via resource process 10), resource process 10 may adjust the logging based on real run-time costs.

In some implementations, resource process 10 may identify 300 the current amount of resources used by client electronic device 38 to implement dynamic logging using, e.g., a log 4j xml file. For example, resource process 10 may take an initial measurement of the current level of resources used by client electronic device 38. For instance, on an idle system, resource process 10 may obtain or receive the current level of resources used by client electronic device 38 (or the current Java Virtual Machine (JVM) where the logging occurs). Resource process 10 may then launch a test by, e.g., exercising some logging output (e.g., anything, just test data, etc.) for a "short" test period of time (e.g., 1 second-60 seconds). Resource process 10 may then measure, e.g., (1) the highest peak of resources used by client electronic device 38 during the test period, and (2) the number of logging calls that were made during the test period. In some implementations, by subtracting the resource level at peak time from the resource level at starting point, resource process 10 may identify 300 (e.g., estimate) a resource average usage for each logging call on client electronic device 38, and may use that information to estimate 302 the future amount of resources for executing the trace for the subsystem of client electronic device 38.

In some implementations, resource process 10 may take run-time measurements. For example, at run-time, resource process 10 may (e.g., as a background process) measure how many calls are made to the logging output per second and per logging subsystem (e.g., database, API, web services, Enterprise Java Beans, etc.), which may provide information about the resource cost of each logging subsystem in real time. Thus, in the example, resource process 10 may identify 300 resource usage, and may use that information to estimate 302 the future amount of resources for executing the trace for the subsystem of client electronic device 38.

In some implementations, resource process 10 may identify 304 one or more rules for executing the trace for the subsystem of the computing device, wherein the one or more rules may be based upon, at least in part, at least one of the current amount of resources used by the computing device and the future amount of resources for executing the trace for the subsystem of the computing device. In some implementations, resource process 10 may determine 306 whether to execute the trace for the subsystem of the computing device based upon, at least in part, the one or more rules. For example, as noted above, logging may be resource intensive (e.g., CPU, memory, disk I/O, etc.) and may cause performance issues in the system. For example, a system may be operating well initially upon (or before) executing a logging process, but may crash or decrease performance too much when the workload increases from executing the logging process. In a system composed of multiple (or few) components, it may be beneficial to determine 306 whether to execute specific traces for specific components/subsystems to avoid system performance issues. In some implementations, the above-noted rules may be used to reduce the logging level, from detail to error for example. In some implementations, the above-noted rules may be used to determine 306 whether to execute the trace.

For example, in some implementations, resource process 10 may determine 308 whether the current amount of resources used by the computing device combined with the future amount of resources for executing the trace for the subsystem of the computing device would exceed a threshold amount of resources used by the computing device. For instance, assume for example purposes only that a user (e.g., user 46) does not want one or more of the system resources (e.g., CPU usage) to go above, e.g., 70%. In the example, and referring at least to an example user interface (e.g., UI 400 of FIG. 4) associated with resource process 10, user 46 (e.g., via resource process 10) may set a rule (e.g., Rule 1) to specify that the threshold amount of resources (e.g., CPU usage) used by the computing device should not exceed 70% (e.g., using drop down menu 402).

In some implementations, at least one rule of the one or more rules may include executing the trace for the subsystem of the computing device if the current amount of resources used by the computing device combined with the future amount of resources for executing the trace for the subsystem of the computing device would not exceed the threshold amount of resources used by the computing device. For instance, and continuing with the above-example of a 70% CPU usage threshold, further assume that client electronic device 38 is currently executing, e.g., one or more processes, resulting in the use of CPU resources of client electronic device 38. In the example, resource process 10 may identify 300 the current amount of resources used by client electronic device 38 is, e.g., 50%. Further assume in the example that resource process 10 may estimate 302 the future amount of resources for executing Trace A for the subsystem of client electronic device 38 is, e.g., 19%. Thus, in this example, resource process 10 may determine 308 that the current amount of CPU resources used by client electronic device 38 (e.g., 50%) combined with the future amount of CPU resources for executing Trace A for the subsystem of client electronic device 38 (e.g., 19%) would not exceed the threshold amount of CPU resources (e.g., 70%) used by client electronic device 38, since the combined CPU resources used by client electronic device 38 would be 69%. Accordingly, for Rule 1 in the example, resource process 10 may execute Trace A for the subsystem of client electronic device 38.

In some implementations, at least one rule of the one or more rules may include preventing execution of the trace for the subsystem of the computing device if the current amount of resources used by the computing device combined with the future amount of resources for executing the trace for the subsystem of the computing device would exceed the threshold amount of resources used by the computing device. For instance, now assume in the example that client electronic device 38 is currently executing, e.g., one or more processes, resulting in the use of CPU resources of client electronic device 38. In the example, resource process 10 may identify 300 the current amount of resources used by client electronic device 38 is, e.g., 50%. Further assume in the example that resource process 10 may estimate 302 the future amount of resources for executing Trace A for the subsystem of client electronic device 38 is, e.g., 25%. Thus, in this example, resource process 10 may determine 308 that the current amount of CPU resources used by client electronic device 38 (e.g., 50%) combined with the future amount of CPU resources for executing Trace A for the subsystem of client electronic device 38 (e.g., 25%) would exceed the threshold amount of CPU resources (e.g., 70%) used by client electronic device 38, since the combined CPU resources used by client electronic device 38 would be 75%. Accordingly, for Rule 1 in the example, resource process 10 may prevent the execution of Trace A for the subsystem of client electronic device 38. In some implementations, according to the example Rule 1, resource process 10 may prevent the execution of any trace for the subsystem of client electronic device 38. As such, "Trace A" may be a specific trace, a group of traces (e.g., by class), or all traces.

It will be appreciated that while only one type of resource is discussed (i.e., CPU usage) for ease of explanation, any other types of resources (e.g., memory usage, I/O usage, etc.) may be used. That is, CPU usage, memory usage, I/O usage, etc., taken singly or in any combination, may be used to set thresholds without departing from the scope of the disclosure.

In some implementations, the subsystem may include a priority. For example, resource process 10 may enable rules pertaining to the specific subsystem on which to have the trace executed. For instance, assume for example purposes only that a user (e.g., user 46) does not want one or more of the system resources (e.g., CPU usage) to go above, e.g., 70%, except if executing Trace A on a particular subsystem (e.g., a web service). In the example, and referring at least to an example user interface (e.g., UI 500 of FIG. 5) associated with resource process 10, user 46 (e.g., via resource process 10) may set a rule (e.g., Rule 2) to specify that the threshold amount of resources (e.g., CPU usage) used by the computing device should not exceed 70%, unless Trace A (or other Trace) is to be executed on a web service (e.g., using drop down menu 502). Thus, in the example, the web service is assigned priority over other types of subsystems (e.g., API, database, etc.).

Figure 5:
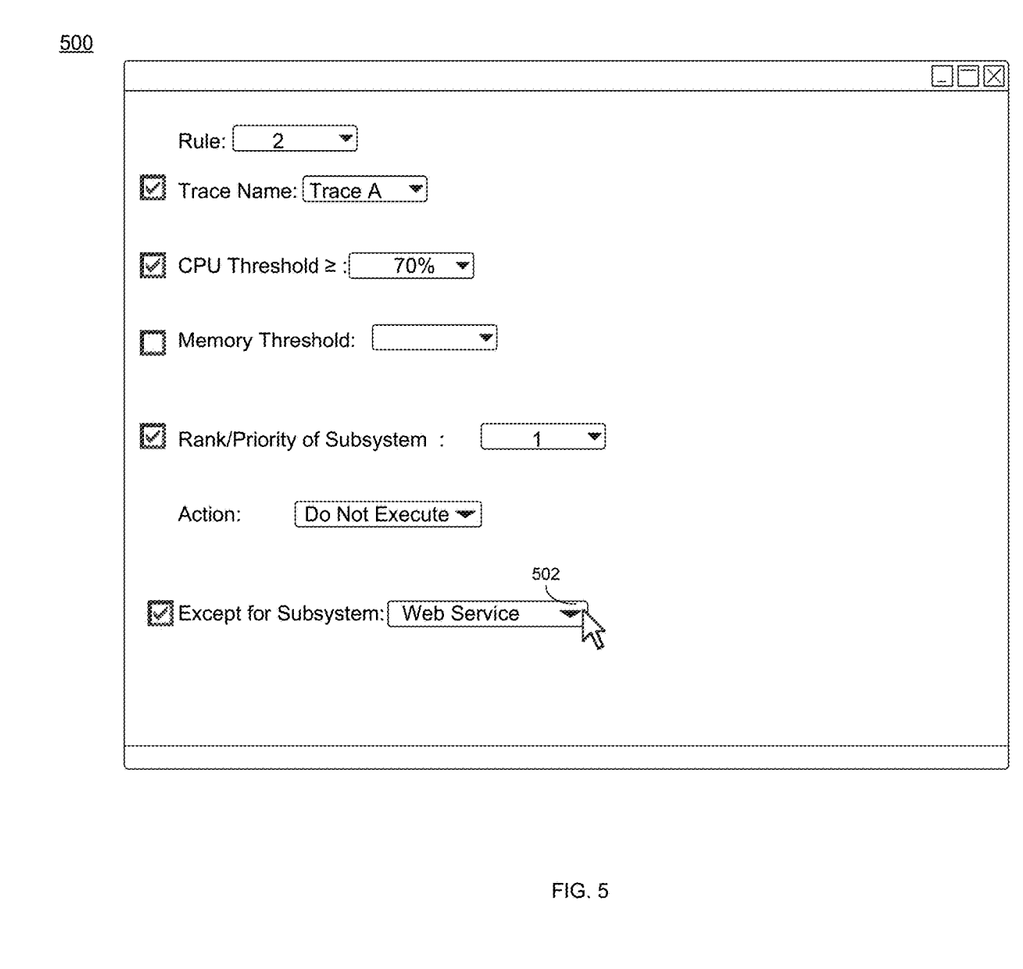
FIG. 5 is an example diagrammatic view of a screen image displayed by a resource process according to one or more example implementations of the disclosure.

Now assume in the example that client electronic device 38 is currently executing, e.g., one or more processes, resulting in the use of CPU resources of client electronic device 38. In the example, resource process 10 may identify 300 the current amount of resources used by client electronic device 38 is, e.g., 50%. Further assume in the example that resource process 10 may estimate 302 the future amount of resources for executing Trace A for the subsystem of client electronic device 38 is, e.g., 25%. Thus, in this example, resource process 10 may determine 308 that the current amount of CPU resources used by client electronic device 38 (e.g., 50%) combined with the future amount of CPU resources for executing Trace A for the subsystem of client electronic device 38 (e.g., 25%) would exceed the threshold amount of CPU resources (e.g., 70%) used by client electronic device 38, since the combined CPU resources used by client electronic device 38 would be 75%. Accordingly, for Rule 2 in the example, even though the combined current and future resource usage would exceed the 70% threshold, resource process 10 may still execute Trace A for the web service of client electronic device 38 due to Rule 2 having an exception if the subsystem is a web service. On the other hand, if Trace A were executing on a different type of subsystem (e.g., database), resource process 10 may prevent the execution of Trace A for the database.

In some implementations, at least one rule of the one or more rules may include enabling, during run-time, execution of the trace for the subsystem of the computing device if the current amount of resources used by the computing device exceeds the threshold amount of resources used by the computing device and the priority for the subsystem is at a predetermined level. For example, resource process 10 may enable rules pertaining to the specific subsystem priority (e.g., in the log 4j xml file) on which to have the trace executed. For instance, assume for example purposes only that a user (e.g., user 46) does not want one or more of the system resources (e.g., CPU usage) to go above, e.g., 70%, except if executing Trace A on a particular subsystem with a ranking less than or equal to 4 (e.g., using a 1-10 scale with 1 being the most important and 10 being the least important). In the example, and referring at least to an example user interface (e.g., UI 600 of FIG. 6) associated with resource process 10, user 46 (e.g., via resource process 10) may set a rule (e.g., Rule 3) to specify that the threshold amount of resources (e.g., CPU usage) used by the computing device should not exceed 70%, unless Trace A (or other Trace) is to be executed on a subsystem with a priority level less than or equal to 4 (e.g., using drop down menu 602). In some implementations, the priority level assigned to the subsystem may be a rank of importance (e.g., 1-10 scale with 1 being the most important and 10 being the least important), a level of importance (e.g., high, medium, low, etc.) or other. It will be appreciated that other techniques for assigning priority may also be used without departing from the scope of the disclosure. In some implementations, the priority level may be assigned to the particular trace (e.g., Trace A).

Figure 6:
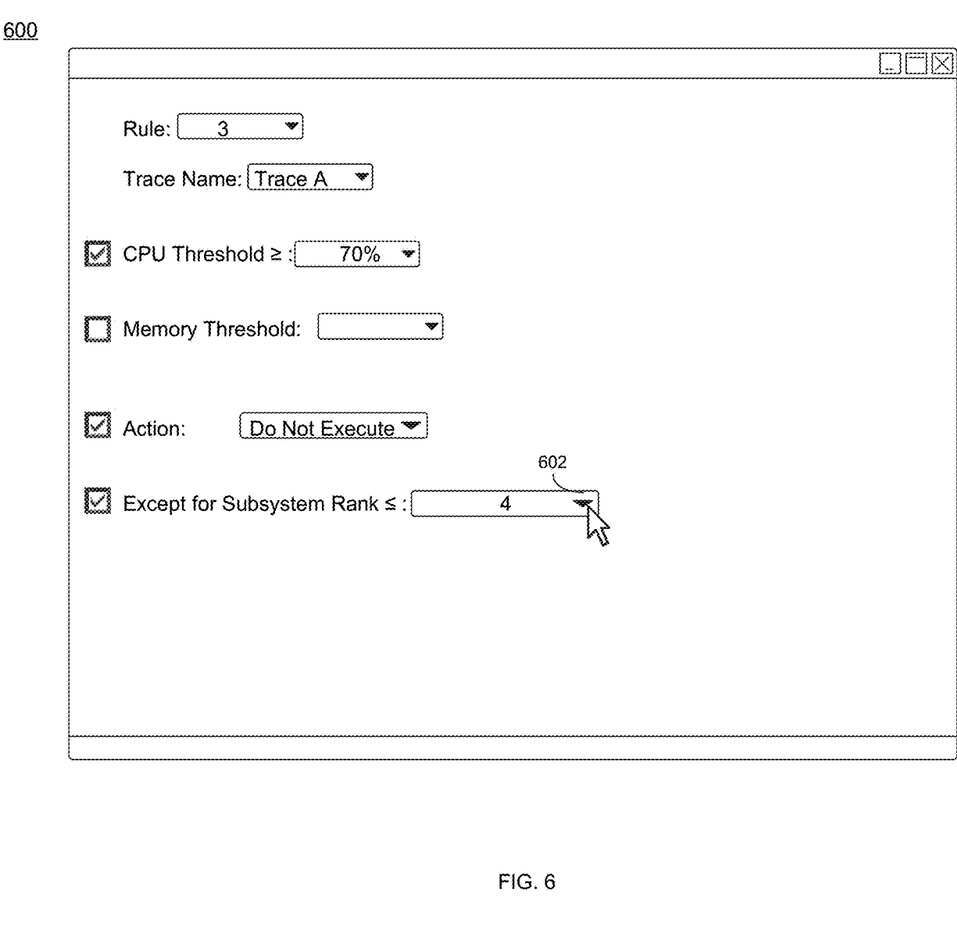
FIG. 6 is an example diagrammatic view of a screen image displayed by a resource process according to one or more example implementations of the disclosure.

Now assume in the example that client electronic device 38 is currently executing, e.g., one or more processes, resulting in the use of CPU resources of client electronic device 38. In the example, resource process 10 may identify 300 the current amount of resources used by client electronic device 38 is, e.g., 50%. Further assume in the example that Trace A is currently running on a subsystem on client electronic device 38 with a priority of 3. Now assume that resource process 10 may identify 300 the current amount of resources used by client electronic device 38 increases to, e.g., 75%. Thus, in this example, resource process 10 may determine that the current amount of CPU resources used by client electronic device 38 (e.g., 75%) currently exceeds the threshold amount of CPU resources (e.g., 70%) used by client electronic device 38 while Trace A is currently running on client electronic device 38. Accordingly, for Rule 3 in the example, even though the current resource usage currently exceeds the 70% threshold, resource process 10 may still enable (or continue to enable) execution of Trace A for the subsystem of client electronic device 38, due to Rule 3 having an exception if the subsystem has a priority of less than or equal to 4.

In some implementations, at least one rule of the one or more rules may include disabling, during run-time, execution of the trace for the subsystem of the computing device if the current amount of resources used by the computing device exceeds the threshold amount of resources used by the computing device and the priority for the subsystem is at a predetermined level. Now assume in the example that client electronic device 38 is currently executing, e.g., one or more processes, resulting in the use of CPU resources of client electronic device 38. In the example, resource process 10 may identify 300 the current amount of resources used by client electronic device 38 is, e.g., 50%. Further assume in the example that Trace A is currently running on a subsystem on client electronic device 38 with a priority of 6. Now assume that resource process 10 may identify 300 the current amount of resources used by client electronic device 38 increases to, e.g., 75%. Thus, in this example, resource process 10 may determine that the current amount of CPU resources used by client electronic device 38 (e.g., 75%) currently exceeds the threshold amount of CPU resources (e.g., 70%) used by client electronic device 38 while Trace A is currently running on the subsystem of client electronic device 38. Accordingly, for Rule 3 in the example, due to the current resource usage exceeding the 70% threshold, resource process 10 may disable execution of Trace A for the subsystem of client electronic device 38 with the ranking of 6.

In some implementations, logging for Trace A may be re-enabled should the necessary amount of resources become available. For instance, and continuing with the above example of Rule 3, further assume that, after disabling Trace A from running on the subsystem of client electronic device 38 with the ranking of 6, resource process 10 may identify 300 the current amount of resources used by client electronic device 38 (and/or estimated 302 future amount of resources for executing Trace A) is once again, e.g., 50%. Accordingly, for Rule 3 in the example, due to the current resource usage (and/or estimated 302 future amount of resources for executing Trace A) no longer exceeding the 70% threshold, resource process 10 may re-enable execution of Trace A for the subsystem of client electronic device 38 with the ranking of 6.

It will be appreciated that any other rules may be used without departing from the scope of the disclosure. For example, the rules may be based only upon the current amount of resources being used, only the future amount of resources being used, or both the current and future amount of resources being used. It will also be appreciated that multiple rules may be combined without departing from the scope of the disclosure. For example, Rules 1, 2 and 3 may be combined, such that multiple traces may be disabled based upon their priority to decrease the CPU usage to below the threshold level, or not to exceed the CPU usage threshold level. For example, in some implementations, if the overall CPU threshold reaches 70%, resource process 10 may first deactivate the database logging, as it may have the lowest priority. If more CPU resources are needed, resource process 10 may then deactivate the API logging, as it may have mid-level priority. If more CPU resources are needed, resource process 10 may keep the web service logging on regardless of resources used, as it may have the highest priority. As such, any disclosure of a particular rule or combination of rules should be taken as example only and not to otherwise limit the scope of the disclosure.

It will be appreciated that other types of processes besides logging (e.g., tracing) may be used without departing from the scope of the disclosure. As such, the use of logging rules should be taken as an example only and not to limit the scope of the disclosure.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
   identifying, by a computing device, a current amount of resources used by the computing device;
   estimating a future amount of resources for executing a trace for a subsystem of the computing device, wherein the subsystem includes a priority;
   identifying one or more rules for executing the trace for the subsystem of the computing device, wherein the one or more rules are based upon, at least in part, at least one of the current amount of resources used by the computing device and the future amount of resources for executing the trace for the subsystem of the computing device; and determining whether to execute the trace for the subsystem of the computing device based upon, at least in part, the one or more rules.

2. The computer-implemented method of claim 1 further comprising determining whether the current amount of resources used by the computing device combined with the future amount of resources for executing the trace for the subsystem of the computing device would exceed a threshold amount of resources used by the computing device.

3. The computer-implemented method of claim 2 wherein at least one rule of the one or more rules includes executing the trace for the subsystem of the computing device if the current amount of resources used by the computing device combined with the future amount of resources for executing the trace for the subsystem of the computing device would not exceed the threshold amount of resources used by the computing device.

4. The computer-implemented method of claim 2 wherein at least one rule of the one or more rules includes preventing execution of the trace for the subsystem of the computing device if the current amount of resources used by the computing device combined with the future amount of resources for executing the trace for the subsystem of the computing device would exceed the threshold amount of resources used by the computing device.

5. The computer-implemented method of claim 1 wherein at least one rule of the one or more rules includes disabling, during run-time, execution of the trace for the subsystem of the computing device if the current amount of resources used by the computing device exceeds the threshold amount of resources used by the computing device and the priority for the subsystem is at a predetermined level.

6. The computer-implemented method of claim 1 wherein at least one rule of the one or more rules includes enabling, during run-time, execution of the trace for the subsystem of the computing device if the current amount of resources used by the computing device exceeds the threshold amount of resources used by the computing device and the priority for the subsystem is at a predetermined level.

7. A computer program product residing on a non-transitory computer readable storage medium having a plurality of instructions stored thereon which, when executed across one or more processors, causes at least a portion of the one or more processors to perform operations comprising:

identifying a current amount of resources used by a computing device;

estimating a future amount of resources for executing a trace for a subsystem of the computing device, wherein the subsystem includes a priority;

identifying one or more rules for executing the trace for the subsystem of the computing device, wherein the one or more rules are based upon, at least in part, at least one of the current amount of resources used by the computing device and the future amount of resources for executing the trace for the subsystem of the computing device; and determining whether to execute the trace for the subsystem of the computing device based upon, at least in part, the one or more rules.

8. The computer program product of claim 7 further comprising determining whether the current amount of resources used by the computing device combined with the future amount of resources for executing the trace for the subsystem of the computing device would exceed a threshold amount of resources used by the computing device.

9. The computer program product of claim 8 wherein at least one rule of the one or more rules includes executing the trace for the subsystem of the computing device if the current amount of resources used by the computing device combined with the future amount of resources for executing the trace for the subsystem of the computing device would not exceed the threshold amount of resources used by the computing device.

10. The computer program product of claim 8 wherein at least one rule of the one or more rules includes preventing execution of the trace for the subsystem of the computing device if the current amount of resources used by the computing device combined with the future amount of resources for executing the trace for the subsystem of the computing device would exceed the threshold amount of resources used by the computing device.

11. The computer program product of claim 7 wherein at least one rule of the one or more rules includes disabling, during run-time, execution of the trace for the subsystem of the computing device if the current amount of resources used by the computing device exceeds the threshold amount of resources used by the computing device and the priority for the subsystem is at a predetermined level.

12. The computer program product of claim 7 wherein at least one rule of the one or more rules includes enabling, during run-time, execution of the trace for the subsystem of the computing device if the current amount of resources used by the computing device exceeds the threshold amount of resources used by the computing device and the priority for the subsystem is at a predetermined level.

13. A computing system including one or more processors and one or more memories configured to perform operations comprising:

identifying a current amount of resources used by a computing device;

estimating a future amount of resources for executing a trace for a subsystem of the computing device, wherein the subsystem includes a priority;

identifying one or more rules for executing the trace for the subsystem of the computing device, wherein the one or more rules are based upon, at least in part, at least one of the current amount of resources used by the computing device and the future amount of resources for executing the trace for the subsystem of the computing device; and determining whether to execute the trace for the subsystem of the computing device based upon, at least in part, the one or more rules.

14. The computing system of claim 13 further comprising determining whether the current amount of resources used by the computing device combined with the future amount of resources for executing the trace for the subsystem of the computing device would exceed a threshold amount of resources used by the computing device.

15. The computing system of claim 14 wherein at least one rule of the one or more rules includes executing the trace for the subsystem of the computing device if the current amount of resources used by the computing device combined with the future amount of resources for executing the trace for the subsystem of the computing device would not exceed the threshold amount of resources used by the computing device.

16. The computing system of claim 14 wherein at least one rule of the one or more rules includes preventing execution of the trace for the subsystem of the computing device if the current amount of resources used by the computing device combined with the future amount of resources for executing the trace for the subsystem of the computing device would exceed the threshold amount of resources used by the computing device.

17. The computing system of claim 13 wherein at least one rule of the one or more rules includes disabling, during run-time, execution of the trace for the subsystem of the computing device if the current amount of resources used by the computing device exceeds the threshold amount of resources used by the computing device and the priority for the subsystem is at a predetermined level.

* * * * *